Feb. 15, 1949.        F. E. CREVER        2,461,964
REGULATOR CIRCUIT
Filed May 11, 1946
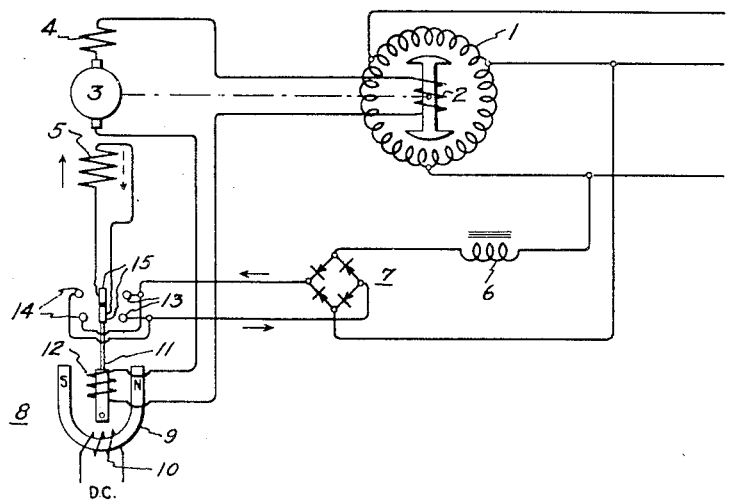
Inventor:
Frederick E. Crever,
by Prowell & Mack
His Attorney.

Patented Feb. 15, 1949

2,461,964

UNITED STATES PATENT OFFICE 2,461,964

REGULATOR CIRCUIT

Frederick E. Crever, Scotia, N. Y., assignor to General Electric Company, a corporation of New York Application May 11, 1946, Serial No. 669,204

6 Claims. (Cl. 322—24)

My invention relates broadly to an automatic regulator system for dynamo electric machines and more particularly to improvements in an automatic regulator system of the static type for controlling the output of a synchronous alternating current generator.

It is desirable, particularly in the case of alternating current generators of medium or small capacity, to provide a simplified and inexpensive automatic regulator of the static type for such machines and which will permit parallel operation with safety and stability. One method of obtaining satisfactory regulation is to provide the direct current exciter for the main generator field with a series field winding for supplying self excitation to the exciter, and to provide a separately excited control field winding for the exciter which, in turn, is energized in response to a load condition of the alternating current generator to be regulated. The control field acts in opposition to the series field on the exciter when the desired generator output voltage level has been reached, and thereby holds the resultant excitation of the exciter to the desired level and, consequently, properly regulates the output voltage of the generator to the desired value. With this method of self excitation of the exciter depending on the residual magnetism of the exciter structure, there is always present the possibility that the exciter may build up with reverse polarity, the control field is then cumulative; in this case regulation control is lost and the generator output voltage will build up to a dangerously high value.

Accordingly, it is an object of my invention to provide a simple automatic regulator for dynamo electric machines that is safe and foolproof in its operation.

Another object of my invention is to provide a simple, inexpensive and automatic regulator of the static type for alternating current generators designed for stable parallel operation of such machines.

In a preferred arrangement of my invention, I provide a direct current exciter mechanically connected to the alternating current generator the output of which it is desired to control. The direct current exciter is self-excited as by means of a series field winding, and is also provided with a separately-excited control field winding energized in response to an output condition of the alternating current generator. The control field winding is energized by means of rectified alternating current taken from the output of the generator and applied in a direction to oppose the magnetic field produced in the exciter by the series field winding. Therefore, as the voltage output of the generator rises to the desired level due to the series excitation of the exciter, the series excitation will be opposed or bucked down by the increased excitation of the control field so as to maintain the desired voltage level. If, for any reason, the exciter voltage starts to build up in a reverse direction or is reversed during an operating condition due to a leading reactive load, the system would lose control as the control field winding would then supplement the flux produced by the series field winding, the exciter becomes a cumulative compound exciter, and the resulting output voltage of the generator will rise to dangerously high values. In order to overcome this, I provide a polarized relay inserted in the exciter armature circuit and which is effective to reverse the circuit connections to the control field. By this means the control field is always maintained at opposite polarity from the series field of the exciter, irrespective of the polarity of the exciter, and proper regulation is insured.

My invention will be better understood from the following description taken in connection with the accompanying drawing, and its scope will be pointed out in the appended claims.

Referring now to the drawing, the single figure of which shows diagrammatically a preferred embodiment of my invention as applied to a regulator for a three phase alternating current generator. I have shown a three phase alternating current generator having conventional armature windings 1 and a field winding 2. It should be appreciated that my invention is equally applicable to single or multiphase alternating current generators and, with modifications, to direct current generators as well. Mechanically coupled to the generator is a direct current exciter having an armature 3 and a main series field winding 4. A separately excited control field winding 5 is also disposed on the magnetic structure of the exciter.

For energizing the separately excited differential control field and providing the regulating action of my invention I have shown a circuit connected across any pair of generator output leads and including in series relationship the saturable reactor 6 and the input terminals of the full-wave rectifier 7, which preferably may be of the dry type such as a copper oxide rectifier. For controlling the direction of current flow in the control field 5 and accordingly, its magnetic polarity, a polarized relay 8 is provided which includes a magnetic structure 9, a direct current winding 10 for energizing the magnetic structure 9, and a movable magnetizable armature 11 carrying the relay-actuating winding 12. It should be noted that the armature winding 12 of the relay is connected in series circuit relationship with the armature circuit of the exciter and, therefore, the magnetic polarity of the relay armature 11 depends upon the direction of current flow in the exciter armature circuit.

While I have shown the magnetic structure 9 of the polarized relay 8 as energized to produce constant magnetic polarity by means of the direct current winding 10, is should also be understood that the winding 10 could be omitted and a permanent magnet structure substituted therefor. Also, the winding 12 may be placed on the magnetic structure 9 and the relay armature 11 may be a permanent magnet. Many of the well known types of polarized relays can be adapted for the purpose of my invention. Connected to the output terminals of the rectifier 7 are two sets of contacts 13 and 14, respectively, which are cross-connected to function as a reversing switch for the control field winding 5 when acting in cooperation with the movable contacts 15 mounted on the relay armature 11. The relay contacts should be provided with sufficient wipe, and arranged so that for an instant of time both pairs 13 and 14 are connected to the movable contacts 15. This overlap will thus prevent any deleterious arcing as the current is changed. Thus if we assume the direction of current flow from the output of the full wave rectifier is always in the direction as shown by the arrows, when the relay armature is thrown to the right the contacts 13 and 15 will be engaged and current will flow through the control field winding 5 in the direction as shown by the solid arrow alongside the winding 5. If the relay on the armature is thrown to the left-hand position, contacts 14 and 15 will then be in engagement and the control field current will flow in the winding 5 in the reverse direction as shown by the dotted arrow alongside winding 5. The armature 11 of the polarized relay 8 will be actuated to the right or left depending on the direction of current flow in the exciter armature-generator field circuit and in the relay armature winding 12, since the magnetic structure of relay 8 is of constant magnetic polarity.

The characteristics of the saturable reactor 6 in the supply circuit for the control field winding are selected so that very little alternating current is passed through the reactor to the rectifier 7 until a certain predetermined value of alternator voltage is attained, preferably the desired output voltage of the alternator, at which point the reactor will saturate. When the reactor is saturated, the current through the reactor rises sharply as a function of the alternator voltage, and this current is rectified by means of the full-wave rectifier 7 and passed through the control field winding 5 in a direction to produce a flux opposing that produced by the series field winding 4 of the exciter as previously described. Thus the resultant or net flux effective to produce exciter output is limited, and it will be found that the alternator voltage will be regulated quite closely about the desired value. In the event the exciter polarity is reversed due to loss of residual magnetism in the exciter frame or due to transient surges, the polarized relay then operates to reverse the control field flux polarity; hence, the control field 5 is maintained in opposition to the series field 4 and there is no danger of instability or excessive voltage of the generator.

From the foregoing description it can be seen that I have provided a safe and foolproof system for automatically regulating the output voltage of a dynamo-electric machine which at the same time is simple and inexpensive. By means of the polarized relay, it is impossible for the control field to attain a polarity that would be the same as the series field, thereby producing an unstable voltage characteristic for the alternating current generator. This system has marked advantages for the control of smaller size dynamo-electric machines, and is especially suitable where it is desired to operate two or more of such machines in parallel and where stability is essential. Inasmuch as the polarized relay will only operate infrequently, and the relay contacts are provided with an overlapping wipe, as previously described, there will be no burning or deterioration of the relay contacts and the maintenance required by my invention will be negligible.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A regulating system for an electric generator having a field winding comprising, an exciter having a series field winding and connected to supply energizing current to said generator field winding, a separately excited control field winding for said exciter, means responsive to a predetermined output voltage of said generator for supplying energizing unidirectional current to said control field winding to maintain said voltage output substantially constant, and relay means acting in response to the polarity of said series field winding to connect said control field winding so that the flux produced by said control field winding is maintained in opposition to the flux produced by said series field winding, said relay means ensuring opposition of the fluxes produced by said series field winding and by said control field winding for either polarity of the flux of said series field winding.

2. A regulating circuit for an alternating current dynamoelectric machine, having a field winding comprising, a direct current exciter having a series field winding and connected to supply current to said machine field winding, a separately excited differential control field winding for said exciter, means responsive to a predetermined value of machine voltage for supplying energizing unidirectional current to said control field winding to maintain said voltage output substantially constant, and polarized relay means responsive to the polarity of said series field winding and effective to connect said control field winding so that the flux of said control field winding is maintained differentially with respect to the flux of said series field winding, said relay means ensuring opposition of the fluxes produced by said series field winding and by said separately excited control field winding for either polarity of the flux of said series field winding.

3. A regulating system for a dynamoelectric machine having a field winding comprising, a direct current exciter connected to energize said field winding, a self-excited main field winding for said exciter, a separately excited control field winding for said exciter, means responsive to the output voltage of said dynamoelectric machine for supplying unidirectional current to said control field winding to maintain said output voltage substantially constant, and means responsive to the polarity of said main field winding for controlling the polarity of said current supply means to maintain said control field winding energized in differential relation to said main field winding, said polarity responsive means ensuring opposition of the fluxes produced by said self-excited main field winding and by said separately excited control field winding for either polarity of said main field winding.

4. A regulating system for a dynamoelectric machine having a field winding comprising, an exciter for supplying current to said machine field winding, a self-excited main field winding for said exciter, a separately excited control field winding for said exciter, regulating means for supplying unidirectional energizing current to said control field winding in response to a predetermined electrical condition of said machine, and means actuable in accordance with the polarity of said main field winding to connect said control field winding in opposition to said main field winding, said polarty responsive means ensuring opposition of the fluxes produced by said self-excited main field winding and by said separately excited control field winding for either polarity of said main field winding.

5. A regulating system for a dynamoelectric machine having a field winding comprising, an exciter having a self-excited main field winding and connected to supply energizing current to said machine field winding, a separately excited control field winding for said exciter, regulating means responsive to a predetermined electrical condition of said machine for supplying unidirectional energizing current to said control field winding, and switching means responsive to the polarity of said main field winding for connecting said control field winding to said regulating means so that the flux produced by said control field winding is maintained in opposition to the flux in said main field winding, said switching means ensuring opposition of the fluxes produced by said main field winding and by said separately excited control field winding for either polarity of said main field winding.

6. A regulating system for a dynamoelectric machine having a field winding comprising, a direct current exciter having a self-excited series field winding and connected to supply current to said machine field winding, a separately excited control field winding for said exciter, regulating means responsive to a predetermined electrical condition of said machine for supplying unidirectional current to said control field winding to maintain said condition substantially constant, and polarized relay means responsive to the direction of current in said series field winding for maintaining the polarity of the flux produced by said control field winding in opposition to the polarity of the flux of said series field winding, said polarized relay means ensuring opposition of the fluxes produced by said series field winding and by said control field winding for either polarity of the flux of said series field winding.

FREDERICK E. CREVER.

REFERENCES CITED

The following references are of record in the file of this patent:

UNITED STATES PATENTS

| Number | Name | Date |
| --- | --- | --- |
| 1,743,096 | Bergvall | Jan. 14, 1930 |
| 1,966,232 | Asbaugh et al. | July 10, 1934 |